(12) United States Patent
Petri

(10) Patent No.: US 7,901,140 B2
(45) Date of Patent: Mar. 8, 2011

(54) SEAL FOR A CLAMPING SYSTEM BEARING LUG

(75) Inventor: Werner Petri, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 573 days.

(21) Appl. No.: 11/994,807

(22) PCT Filed: Jun. 16, 2006

(86) PCT No.: PCT/EP2006/005773
§ 371 (c)(1),
(2), (4) Date: Jan. 4, 2008

(87) PCT Pub. No.: WO2007/003262
PCT Pub. Date: Jan. 11, 2007

(65) Prior Publication Data
US 2008/0193068 A1    Aug. 14, 2008

(51) Int. Cl.
*F16C 33/74*    (2006.01)
(52) U.S. Cl. ............... 384/130; 384/147; 384/153
(58) Field of Classification Search .......... 384/130, 384/139–153, 396; 277/380, 394, 395
See application file for complete search history.

(56) References Cited

U.S. PATENT DOCUMENTS

| | | | | |
|---|---|---|---|---|
| 2,509,436 A | * | 5/1950 | Isenbarger | 277/562 |
| 2,547,185 A | | 4/1951 | Von Bolhar | |
| 2,626,839 A | * | 1/1953 | Creson et al. | 384/153 |
| 3,097,893 A | * | 7/1963 | White | 384/151 |
| 3,825,272 A | * | 7/1974 | Townsend | 384/153 |
| 4,204,716 A | * | 5/1980 | Baylor | 277/362 |
| 4,832,665 A | | 5/1989 | Kadota et al. | |
| 4,923,435 A | | 5/1990 | Kadota et al. | |
| 5,685,548 A | * | 11/1997 | Casemir et al. | 277/395 |
| 5,803,850 A | | 9/1998 | Hong et al. | |
| 6,039,664 A | * | 3/2000 | Schmid | 474/135 |

FOREIGN PATENT DOCUMENTS

| | | |
|---|---|---|
| DE | 38 09 169 YA | 10/1988 |
| DE | 195 23 647 Y | 1/1997 |
| DE | 100 62 983 Y | 6/2002 |
| DE | 100 64 611 A | 6/2002 |

* cited by examiner

*Primary Examiner* — Thomas R Hannon
(74) *Attorney, Agent, or Firm* — Lucas & Mercanti, LLP

(57) ABSTRACT

A bearing eye for a tensioning system used in flexible drives. For sealing an annular gap between a fixedly positioned support part and a longitudinal bore of the bearing eye a sealing element is provided which encompasses two radially aligned sealing lips. To this end, in the installed state, the sealing lip is respectively supported on a support disc positioned on the support part and the corresponding further sealing lip is supported on a wall of the bearing eye in the region of the installation space.

20 Claims, 3 Drawing Sheets

SEAL FOR A CLAMPING SYSTEM BEARING LUG

FIELD OF THE INVENTION

The subject of the invention is a bearing eye for a tensioning system used in flexible drives. The bearing eye is, in this case, connected integrally to a pivoted lever which at the free end encompasses a rotatably arranged roller. In the mounted state, the roller is supported non-positively on a traction mechanism, in particular a belt of the flexible drive. The construction further provides that the bearing eye is rotatable relative to a fixed fastening means guided in a longitudinal bore of the bearing eye. In addition, a radial bearing designed as a bearing bush is inserted in an annular gap radially defined by an inner wall of the longitudinal bore and a peripheral surface of the fastening means. The annular gap has a sealing element on both sides for sealing.

BACKGROUND TO THE INVENTION

A bearing eye comprising a bearing bush inserted fixedly in terms of rotation in a housing receiver is disclosed in DE 197 43 480 A1 in which an internal bush is inserted centrally, with clearance. The bearing eye, and thus the tensioning device, are fixed in position on a fixed component, by a screw designed as a fastening means on which the internal bush is guided. An annular gap formed between the peripheral surface of the internal bush and the bearing bush thus has no lateral sealing. Soiling of any kind as well as moisture may consequently penetrate unhindered into the annular gap, which leads to increased wear, in particular in the region of the contact zone. As a result of wear, at the same time the radial play is increased which has a negative effect on the function of the tensioning system and which, at the same time, leads to disadvantageous noise generation.

DE 38 09 169 A1 discloses in FIG. 2 a tensioning system which is fastened via a bearing eye to a fixed machine part, the housing of an internal combustion engine. To this end, a screw is guided through the longitudinal bore of the bearing eye which is screwed into a corresponding threaded bore of the engine block. The axial stops in the region of the bearing eye are thus, on the one hand, formed by the engine block and, on the other hand, by the screw head of the fastening screw. For sealing an annular gap present between the fastening screw and the bore of the bearing eye, seals configured as O-rings are provided on both sides. Disadvantageously, due to their relatively high rigidity, such seals permit no tolerance compensation. This leads to a relatively high sealing friction torque of the O-ring seals which are inserted with a large assembling force into the annular grooves provided therefor. On the other hand, a reduced assembling force causes the risk of leakage, in particular where there is a disadvantageous position tolerance between the connecting parts. So-called foam rings, which are also known as sealing elements, produce a lower friction torque but are not sufficiently sealed where the effect of soiling is great.

SUMMARY OF THE INVENTION

To avoid the drawbacks of the known solutions, it is the object of the invention to produce a bearing eye comprising a sealing element which allows compensation where the tolerances are disadvantageous, as well as a low sealing friction torque. Moreover, a cost-effective sealing element which may be easily mounted is required.

This object is achieved according to the invention such that, for the effective sealing of the annular gap formed inside the bearing eye, a sealing element encompassing at least two sealing lips is provided. According to the invention, to this end the bearing eye is provided with a rectangular installation space in which the sealing element is incorporated. An installed position of the sealing element in which the sealing lips are aligned in the direction of the longest lateral length of the rectangular installation space, permits a desired long sealing lip length, whereby a desired, highly resilient flexible seal may be produced. The long shape of the individual sealing lips thus ensures a greater tolerance compensation relative to the connecting parts, i.e. the fixedly arranged component as well as a pivotable component in the region of the contact faces. The longer sealing lips, moreover, allow the formation of defined sealing edges which also has an advantageous effect on the desired low sealing friction torque. A further advantage of the design of seal according to the invention is that the long sealing lips of the sealing element compensate for a large hearing clearance of the hearing eye, for example, as a result of tolerance, without a negative influence on the sealing effect.

The construction of the sealing element according to the invention further provides that said sealing element encompasses two mutually spread-apart sealing lips extending from the back of the seal which, in the installed state of the sealing element, are sealingly supported on two sealing surfaces arranged parallel to one another, of a fixed and pivotable component of the bearing eye.

Advantageous embodiments of the invention form the subject matter of the subclaims.

A preferred embodiment of the bearing eye comprises a support part of tubular configuration in which the fastening means, preferably a machine screw, is inserted. The width of the support part thus advantageously exceeds the width of the bearing eye by an amount whereby the support part allows the reception of a support disc respectively on both sides of the bearing eye. The support discs connected to the support part, for example, with a positive and/or material fit extend radially over the annular gap of the bearing eye as well as over the recess incorporated on the front face in the bearing eye for receiving the sealing means. The support discs thus provide in the preassembled state of the tensioning system a secure arrangement of the support part, including the radial bearing incorporated in the bearing eye as well as the sealing elements. On the other hand, the support discs ensure an effective protection of the sealing elements, by said support discs completely covering the installation space of the sealing elements.

The bearing eye has respectively on the front face, in a transition zone between the longitudinal bore and the front face, a peripheral recess which is intended for receiving the sealing element. The recess may, for example, be incorporated into the front face of the bearing eye by a machining operation, by means of milling or turning, whereby a step-like contour is produced, in which the sealing element is positioned.

Advantageously, the sealing element according to the invention may be positioned in various positions. In a first installed position, the back of the seal of the sealing element is positioned on the peripheral surface of the fastening means or the support part. The corresponding radially aligned, spread-apart sealing lips are thus supported, on the one hand, on the support disc or directly, for example, on a screw head of the fastening means and, on the other hand, on the wall of the recess of the bearing eye. Said installed position of the sealing element compensates, in particular, for installation clearance present between the bearing eye and the support discs of the support part.

A second installed position of the sealing element provides that the back of the seal thereof bears against the wall of the bearing eye recess. The corresponding axially aligned, spread-apart sealing lips are positioned in the installed position by pretensioning on the peripheral surface of the fastening means or the support part and on the outside on the wall of the bearing eye recess. As a result of said installed position of the sealing element, it is possible, in particular, to compensate for a bearing clearance between the fastening means or the support part and the bearing eye.

A defined installed position of the sealing element, the back of the seal thereof being substantially supported on the radially aligned wall of the bearing eye recess, provides that the inner sealing lip encompasses the entire area of the peripheral surface of the support part or the fastening means. This measure produces a sealing surface extending over the entire length of the sealing lip. The sealing effect is thus, in particular, able to be influenced by the pretensioning force with which the back of the seal as well as the inner sealing lip encompasses the support part or the fastening means. The corresponding outer sealing lip of the sealing element may thus be supported on the recess of the bearing eye with an increased adjusting angle from the back of the seal.

A preferred embodiment of the sealing element according to the invention further provides a length "l" of the sealing lips which exceeds a width "s" of the back of the seal of the sealing element by a factor of $\geq 1.2$. The dimensional ratio improves the desired high resilience of the sealing lips, whereby an improved tolerance compensation is present in combination with a low sealing friction torque.

A further measure according to the invention provides an asymmetrical arrangement of the sealing lips of the sealing element. This includes, for example, a variable length of the sealing lips, whereby the respective sealing lip may be adapted to the structural conditions of the components on which said sealing lip is supported in the installed state. Irrespective of the length of the sealing lips, the respective support force may be influenced by a correspondingly selected adjusting angle or wall thickness profile of the sealing lips.

Preferably an elastomer, in particular nitrile rubber (NBR) or hydrogenated nitrile rubber (HNBR), is suitable as an appropriate material for the sealing element according to the invention. Moreover, a fluorocarbon rubber (FPM or FKW) may be used as a material. Irrespective of the aforementioned sealing materials, selecting a material with a hardness of $\leq 75$ Shore A is preferred.

The construction of the bearing eye according to the invention as a radial bearing preferably encompasses two plain bearing bushes inserted into the annular gap in an axially separated manner. The installed position of the plain bearing bushes thus provides that said plain bearing bushes are guided flush as far as the recess of the bearing eyes on the front face, which are intended for receiving the sealing element.

BRIEF DESCRIPTION OF THE DRAWINGS

The explanation of embodiments of the invention follows, in which.

DETAILED DESCRIPTION OF THE DRAWINGS

Figure 3:
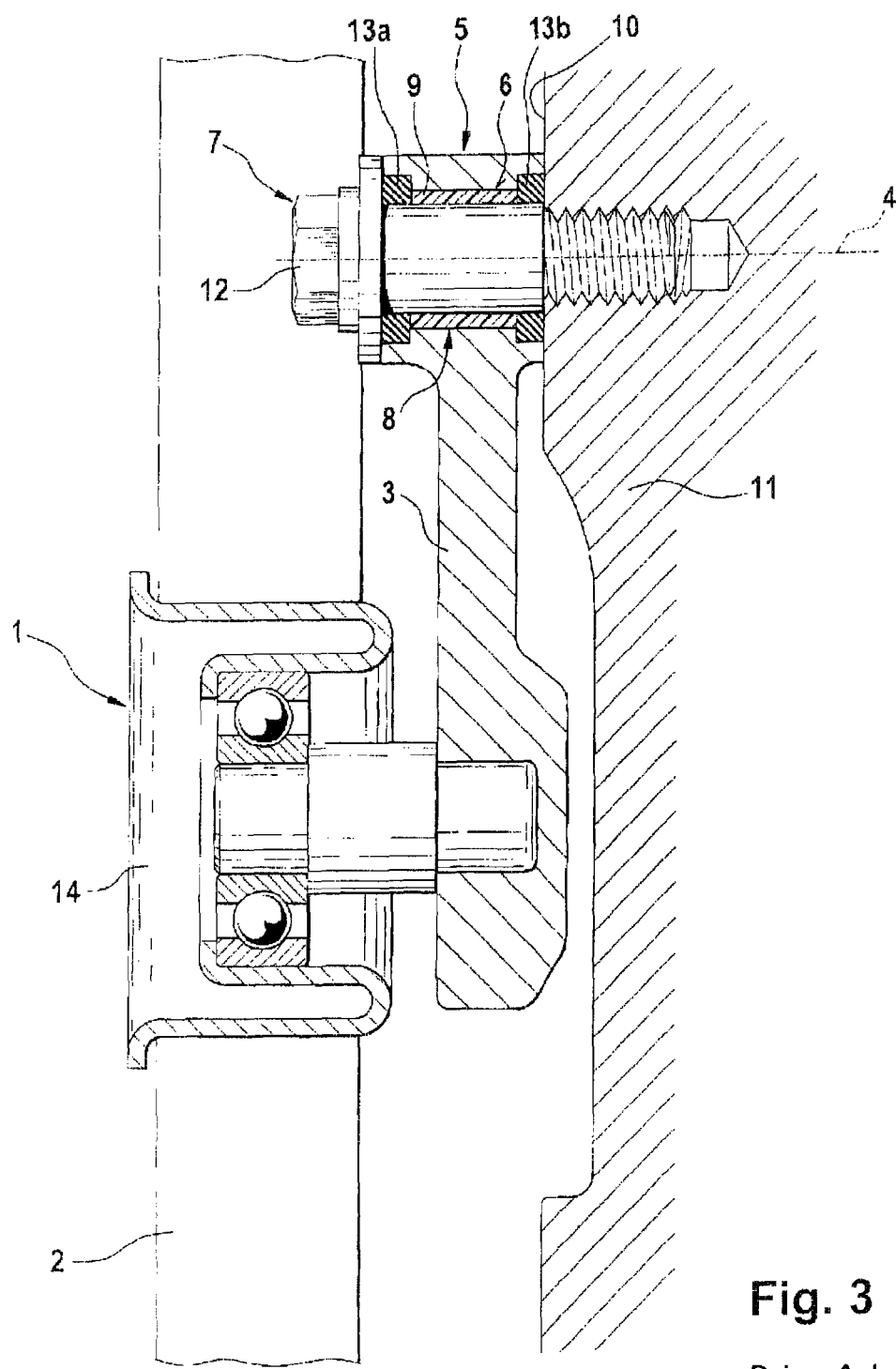
FIG. 3 shows a tensioning system of the known construction in connection with a bearing eye.

FIG. 3, in which a known prior art is shown, is described first. FIG. 3 shows a tensioning system 1 by means of which a traction mechanism 2 of an otherwise not shown flexible drive is pretensioned. The tensioning system 1 comprises a pivoted lever 3, which may be pivoted about a fixed rotational axis 4. In the region of the rotational axis 4, the pivoted lever 3 forms a bearing eye 5. To this end, the pivoted lever 3 is provided with a longitudinal bore 6 which is intended to receive a fastening means 7 configured as a screw. An annular gap 8 formed between the longitudinal bore 6 and the fastening means 7 is intended to receive a plain bearing bush 9, which forms a radial bearing and ensures a displacement of the pivoted lever 3 with low friction. In the installed state, the pivoted lever 3 is supported, on the one hand, on a front face 10 of a fixed machine part 11, for example the housing of an internal combustion engine and, on the opposite side, on a screw head 12 of the fastening means 7. For sealing the annular gap 8 within the bearing eye 5, an O-ring 13a, 13b is associated with both end faces of the plain bearing bush 9 for sealing. On the end remote from the bearing eye 5, the pivoted lever 3 is connected to a roller 14 which, in the installed state, in combination with a spring means not illustrated in FIG. 3, bears non-positively against the traction mechanism 2.

Figure 1:
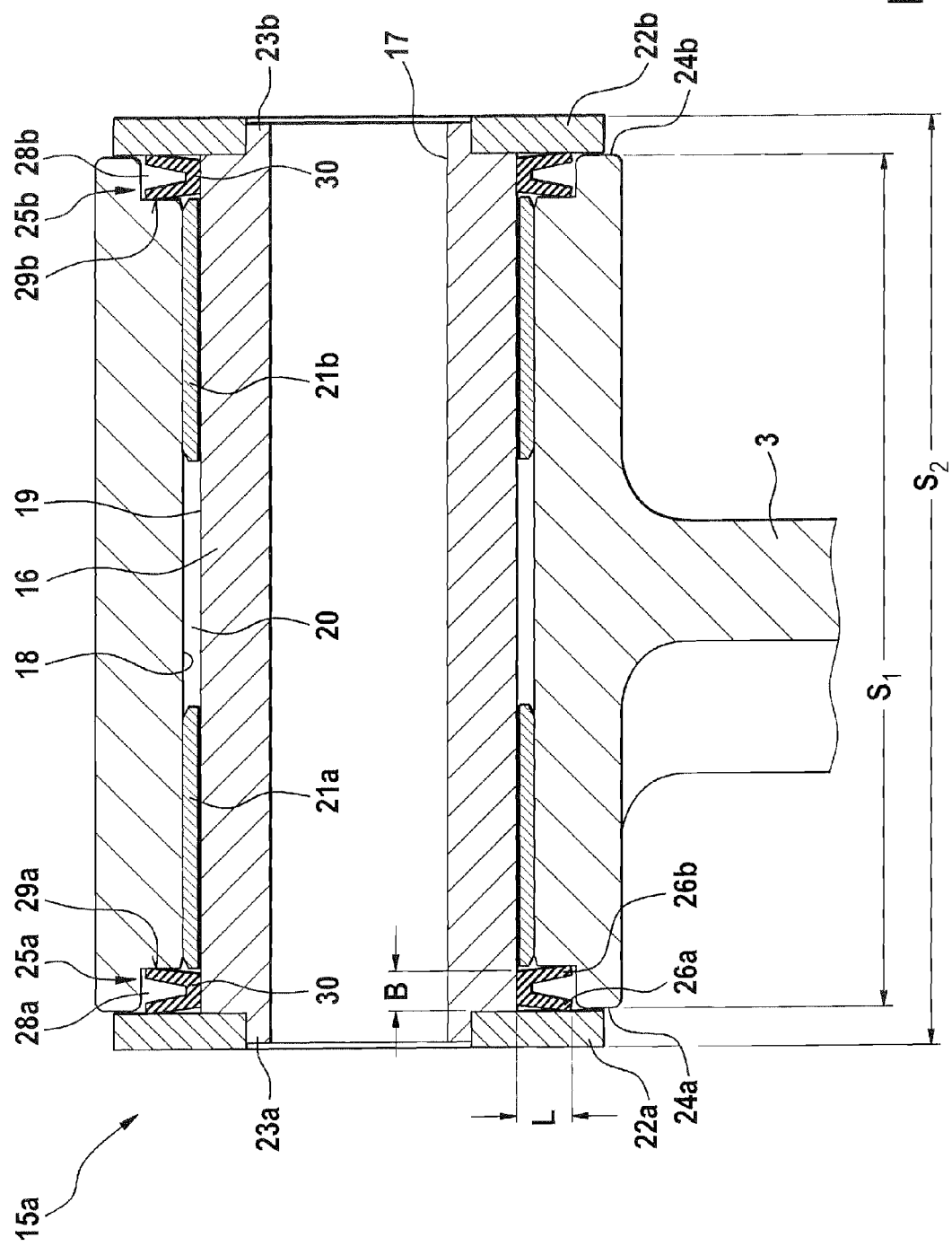
FIG. 1 shows in a sectional view the construction of a bearing eye for a tensioning system in combination with a sealing element according to the invention.

FIG. 1 shows in an enlarged view a bearing eye 15a which, in addition to the bearing eye 5 illustrated in FIG. 3, encompasses a support part 16. A bore 17 of the support part 16 is used for receiving a fastening means, not illustrated in FIG. 1, by means of which the support part 16 is fixed in terms of rotation and position in the installed state. The support part 16 is thus inserted into a longitudinal bore 18 of the bearing eye 15a. An annular gap 20 defined radially by a peripheral surface 19 of the support part 16 and the longitudinal bore 18, is intended for receiving two plain bearing bushes 21a, 21b arranged axially separated from one another, which form the radial bearing. A width "$S_2$" of the support part 16 thus exceeds a width "$S_1$" of the bearing eye 15a. The amount of overlap of the support part 16 on both sides is used for receiving and fixing one respective support disc 22a, 22b. Each support disc 22a, 22b centered on an axially projecting shoulder 23a, 23b radially extends almost over the entire front face 24a, 24b of the bearing eye 15a. For sealing the annular gap 20, the bearing eye 15a comprises two sealing elements 25a, 25b inserted at the ends. The sealing element 25a, 25b encompassing two respective radially aligned sealing lips 26a, 26b additionally encloses with the back of the seal 30 the peripheral surface 19 of the support part 16. For receiving the sealing elements 25a, 25b, the bearing eye 15a respectively has in the region of the front faces 24a, 24b a rectangular installation space 28a, 28b. In the installed state of the sealing element 25a, 25b the mutually spread-apart sealing lips 26a, 26b are supported on the support disc 22a, 22b and/or on a wall 29a, 29b of the installation space 28a, 28b by pretensioning. To achieve sealing lips 26a, 26b acting in a highly resilient manner, said sealing lips are of markedly longer configuration than the corresponding back of the seal 30 of the sealing element 25a, 25b. For clarification, a length "L" of the sealing lips 26a, 26b exceeds a width "B" of the back of the seal 30 by a factor of $\geq 1.2$.

Figure 2:
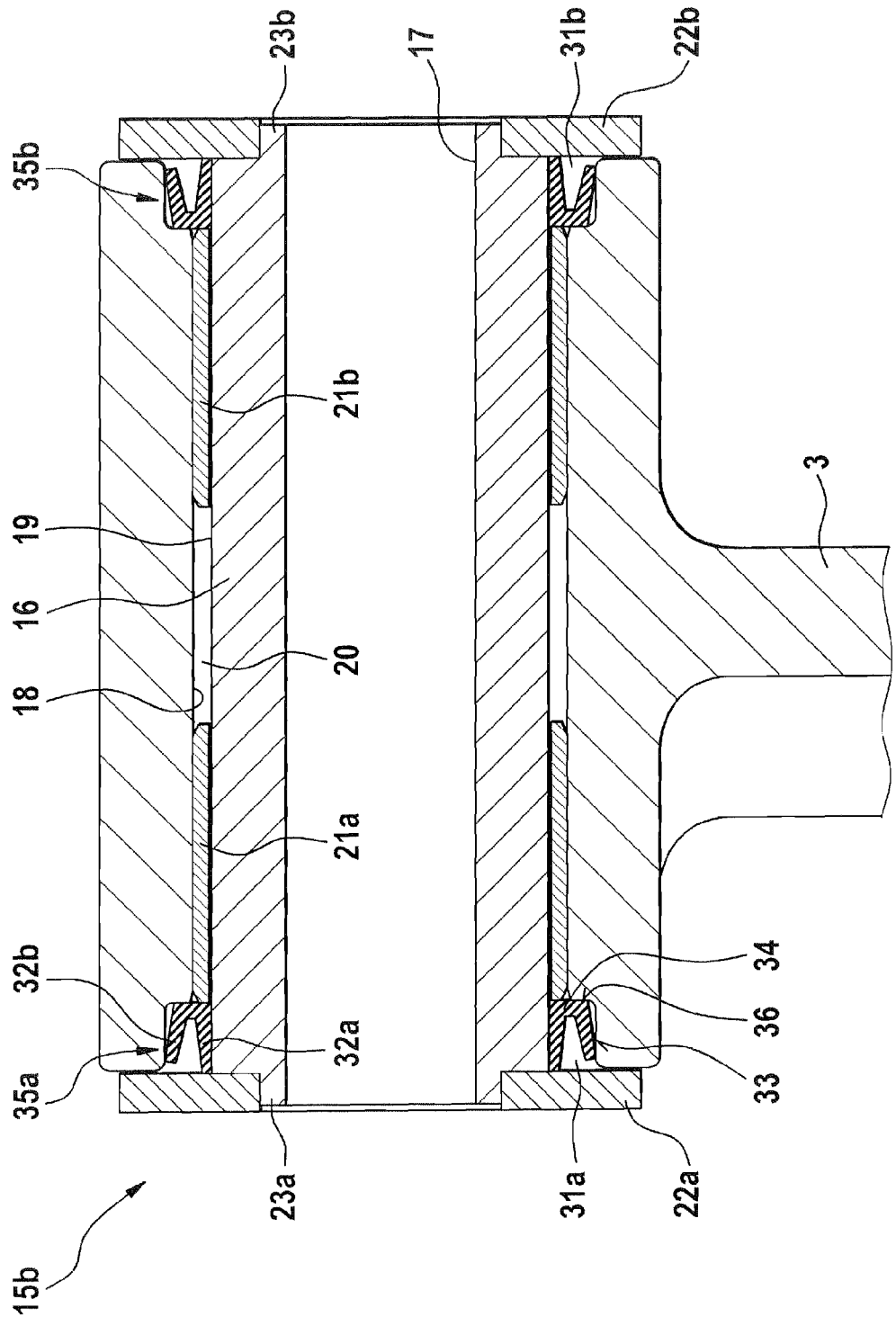
FIG. 2 shows a bearing eye according to FIG. 1 having a sealing element of alternative shape.

The bearing eye 15b illustrated in FIG. 2, substantially coincides with the bearing eye 15a according to FIG. 1, so that the following description is restricted to the differences. The installation space 31a, 31b is arranged in the bearing eye 15b such that the sealing lips 32a, 32b of the sealing element 35a, 35b are axially aligned and in the installed state are supported with pretensioning on the peripheral surface 19 of the support part 16 and externally on a wall 33 of the installation space 31a, 31b. In this case, the back of the seal 34 of the sealing element 35a, 35b is supported on a step 36 of the bearing eye 15b in the region of the installation space 31a, 31b. For achieving an improved seal, it is proposed that an installed position of the sealing element 35a, 35b is selected in which the inner sealing lips 32a bear against the entire area of the peripheral surface 19 of the support part 16. Thus a variable installed position and/or support of the sealing lips 32a, 32b is present. In addition to this variable installed position, the invention further encompasses variable lengths of the sealing lips 32a, 32b of the sealing elements 35a, 35b relative to one another or a variable wall thickness profile of the sealing lips of a sealing element.

LIST OF REFERENCE NUMERALS

1 Tensioning system
2 Traction mechanism
3 Pivoted lever
4 Rotational axis
5 Bearing eye
6 Longitudinal bore
7 Fastening means
8 Annular gap
9 Plain bearing bush
10 Front face
11 Machine part
12 Screw head
13a Sealing ring
13b Sealing ring
14 Roller
15a Bearing eye
15b Bearing eye
16 Support part
17 Bore
18 Longitudinal bore
19 Peripheral surface
20 Annular gap
21a Plain bearing bush
21b Plain bearing bush
22a Support disc
22b Support disc
23a Shoulder
23b Shoulder
24a Front face
24b Front face
25a Sealing element
25b Sealing element
26a Sealing lip
26b Sealing lip
28a Installation space
28b Installation space
29a Wall
29b Wall
30 Back of the seal
31a Installation space
31b Installation space
32a Sealing lip
32b Sealing lip
33 Wall
34 Back of the seal
35a Sealing element
35b Sealing element
36 Step

The invention claimed is:

1. A bearing eye for a tensioning system used in flexible drives which is integrally connected to a pivoted lever which on an end face encompasses a roller supported on a traction mechanism, the bearing eye being rotatable relative to a fixed fastening means guided in a longitudinal bore of the bearing eye and at least one plain bearing bush designed as a radial bearing being inserted in an annular gap radially defined indirectly or directly by an inner wall of the longitudinal bore and a peripheral surface of a support part or the fastening means, and the annular gap being sealed on both sides,
wherein a respective sealing element is provided at each end of the bearing eye, each sealing element having two entirely planer sealing lips that are incorporated in a rectangular installation space at a respective end of the bearing eye, so as to seal the annular gap on each end of the bearing eye, and
wherein a back of the sealing element is positioned on the peripheral surface of the support part and the sealing lips of the sealing element are supported on a support disc and/or a wall of the installation space.

2. The bearing eye as claimed in claim 1, wherein the sealing lips are mutually spread apart and extend from the back of the sealing element.

3. The bearing eye as claimed in claim 1, wherein the support part, which is tubular, is fixed in position by the fastening means, and wherein the support part has a width which exceeds a width of the bearing eye.

4. The bearing eye as claimed in claim 1, wherein the rectangular installation space is stepped and is located in a transition zone, between the longitudinal bore and a front face of the bearing eye.

5. The bearing eye as claimed in claim 1, wherein a length of the scaling lips exceeds a width of the hack of the seal of the scaling element by a factor of $\geq 1.2$.

6. The bearing eye as claimed in claim 1, wherein the sealing lips of the sealing element are asymmetrically arranged.

7. The bearing eye as claimed in claim 1, wherein the sealing elements are produced from an elastomer.

8. The bearing eye as claimed in claim 7, wherein the elastomer is NBR or HNBR.

9. The bearing eye as claimed in claim 1, wherein said bearing eye encompasses two plain bearing bushes forming the radial bearing and arranged axially separated from one another.

10. The bearing eye as claimed in claim 1, further comprising a support disc which is positioned at each end face on the support part, and which extends radially over the annular gap and the installation space and is contactable with a front face of the bearing eye.

11. The bearing eye as claimed in claim 1, wherein two plain bearing hushes, which are axially spaced from one another, form the radial bearing.

12. The bearing eye as claimed in claim 11, wherein the elastomer is NBR or HNBR.

13. A bearing eye for a tensioning system used in flexible drives which is integrally connected to a pivoted lever which on an end face encompasses a roller supported on a traction mechanism, the bearing eye being rotatable relative to a fixed fastening means guided in a longitudinal bore of the bearing eye and at least one plain bearing bush designed as a radial bearing being inserted in an annular gap radially defined indirectly or directly by an inner wall of the longitudinal bore and a peripheral surface of a support part or the fastening means, and the annular gap being sealed on both sides,
wherein a respective sealing element is provided at each end of the bearing eye, each sealing element having two entirely planer sealing lips, an inner sealing lip and an outer sealing lip, that are incorporated in a rectangular installation space at a respective end of the bearing eye, so as to seal the annular gap on each end of the hearing eye,
wherein a back of the sealing element bears against a front face of the installation space of the hearing eye, the inner sealing lip bears with an inner surface entirely against an area of the peripheral surface of the support part, and the outer scaling lip bears against a wall extending parallel to the peripheral surface of the support part in a region of the installation space, and wherein an inner surface of the inner sealing lip bears entirely against an area of the peripheral surface of the support part.

14. The bearing eye as claimed in claim 13, wherein the sealing lips are mutually spread apart and extend from the hack of the sealing element.

15. The bearing eye as claimed in claim 13, wherein the support part, which is tubular, is fixed by the fastening means, and wherein the support part has a width which exceeds a width of the bearing eye.

16. The bearing eye as claimed in claim 13, further comprising a support disc which is positioned at each end face on the support part, and which extends radially over the annular gap and installation space and is contactable with a front face of the bearing eye.

17. The bearing eye as claimed in claim 13, wherein the rectangular installation space, which is step-like, is located in a transition zone, between the longitudinal bore and a front face of the bearing eye.

18. The bearing eye as claimed in claim 13, wherein a length of the scaling lips exceeds a width of the back of the seal of the sealing element by a factor of $\geqq 1.2$.

19. The bearing eye as claimed in claim 13, wherein the sealing lips of the sealing element are asymmetrically arranged.

20. The bearing eye as claimed in claim 13, wherein the sealing elements are produced from an elastomer.

\* \* \* \* \*